United States Patent
Yamagishi

(10) Patent No.: US 7,067,789 B2
(45) Date of Patent: Jun. 27, 2006

(54) METHOD AND DEVICE FOR PRODUCING X-RAY IMAGE DETECTOR, AND X-RAY IMAGE DETECTOR

(75) Inventor: Shirofumi Yamagishi, Tochigi-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 10/487,548

(22) PCT Filed: Aug. 29, 2002

(86) PCT No.: PCT/JP02/08701

§ 371 (c)(1),
(2), (4) Date: Feb. 24, 2004

(87) PCT Pub. No.: WO03/019599

PCT Pub. Date: Mar. 6, 2003

(65) Prior Publication Data

US 2004/0247078 A1    Dec. 9, 2004

(30) Foreign Application Priority Data

Aug. 29, 2001 (JP) .............................. 2001-259086

(51) Int. Cl.
*H05G 1/64* (2006.01)
*H01J 31/50* (2006.01)

(52) U.S. Cl. .................. 250/214; 378/98.8; 445/34; 445/35; 445/36; 445/37; 427/554

(58) Field of Classification Search .............. 250/214; 378/98.8; 445/34, 35, 36, 37, 45; 427/554
See application file for complete search history.

(56) References Cited

U.S. PATENT DOCUMENTS 5,723,865 A * 3/1998 Trissel et al. .............. 250/368

FOREIGN PATENT DOCUMENTS

| JP | 52-93265 | 8/1977 |
| JP | 2-170331 | 7/1990 |
| JP | 3-22325 | 1/1991 |
| JP | 3-280325 | 12/1991 |
| JP | 10-116568 | 5/1998 |
| JP | 2000-75038 A | 3/2000 |
| JP | 2001-93415 | 4/2001 |

* cited by examiner

*Primary Examiner*—David Porta
*Assistant Examiner*—Djura Malevic
(74) *Attorney, Agent, or Firm*—Pillsbury Winthrop Shaw Pittman LLP

(57) ABSTRACT

An X-ray light emitting phosphor film (22) such as a CsI film that converts an X-ray to light is formed on an input substrate (21) constituting an input part of an X-ray image detector. A surface portion of the X-ray light emitting phosphor film (22) is irradiated with high-energy light having a wavelength of 500 nm or less. The surface portion of the X-ray light emitting phosphor film (22) is locally sublimated and/or fused to be flattened by the irradiation with the high-energy light. The use of the high-energy light such as a laser beam makes it possible to efficiently and uniformly flatten the surface portion of the X-ray light emitting phosphor film.

12 Claims, 6 Drawing Sheets

METHOD AND DEVICE FOR PRODUCING X-RAY IMAGE DETECTOR, AND X-RAY IMAGE DETECTOR

TECHNICAL FIELD

The present invention relates to a method and a device for producing an X-ray image detector used for a medical diagnosis apparatus, a nondestructive inspector, and the like, and to the X-ray image detector.

BACKGROUND ART

An X-ray image detector is an apparatus that converts an X-ray that has transmitted through a subject to visible light and is used for medical diagnosis apparatuses, nondestructive inspectors, and so on as an X-ray image intensifier or the like.

Such an X-ray image detector is configured such that an input part that converts an X-ray to photoelectrons and an output part that converts the photoelectrons to visible light are respectively provided on both end portions of a vacuum envelope made of, for example, metal or glass. A focusing electrode and an anode to accelerate and focus the photoelectrons emitted from the input part and directed to the output part are interposed between the input part and the output part. An X-ray image incident on the X-ray image detector is outputted as a visible light image after passing through the input part and the output part. Then, the visible light image outputted from the X-ray image detector is photographed by a CCD camera or the like, so that a subject image is displayed on a monitor television or the like.

The input part of the X-ray image detector is composed of an input substrate having a recessed surface in a shape of, for example, a dome, an X-ray light emitting phosphor film such as a CsI (cesium iodide) film formed by a deposition method on the recessed surface of the input substrate, a transparent conductive film formed on the X-ray light emitting phosphor film, and a photoelectric surface formed on the transparent conductive film. An aggregation of columnar crystals of CsI growing substantially vertically to the input substrate is used as the CsI film constituting the X-ray light emitting phosphor film. The columnar crystals of CsI are separated by minute gaps from one another to increase sharpness of separation between channels, which makes it possible to obtain a high resolution characteristic.

The CsI film mainly formed of the above-mentioned columnar crystals, besides being formed such that the columnar crystals are separated by the minute gaps from one another, has recessions and protrusions formed by tip portions of the columnar crystals. Since the formation of the transparent conductive film and the photoelectric surface on such a CsI film lowers or prevents electrical conduction in the direction of these surfaces, it is necessary to make the surface of the CsI film mainly formed of the columnar crystals continuous and flat. As for the continuous formation of the CsI film, a method of forming a continuous film of CsI on a CsI film mainly formed of columnar crystals in a highly vacuum atmosphere is known as described in, for example, Japanese Patent Laid-open Application No. Hei 2-170331.

In the above-mentioned method of forming the continuous film of CsI, increase in film-growth time and so on are caused and in addition, a sufficient effect of flattening the CsI film cannot be obtained. Therefore, such a method is used in which a plurality of metal balls are rolled on a CsI film mainly formed of columnar crystals to make a surface portion of the CsI film continuous and flat (see Japanese Patent Laid-open Application No. Hei 3-22325 and Japanese Patent Laid-open Application No. Hei 3-280325). This method is a method of plastically deforming top portions of the columnar crystals through the utilization of the weight of the metal balls to thereby make the surface portion of the CsI film continuous and flat.

The above-mentioned flattening method using the balls, however, requires uniform application of the weight of the balls on the entire CsI film, so that the process time required for flattening the CsI film becomes long. Further, due to the irregular movement of the balls, it is difficult to control planarity of the CsI film. Imparting regularity to the movement of the balls in order to control planarity will give rise to such a problem that the regular movement hinders planarity.

Further, Japanese Patent Laid-open Application No. 2001-93415 describes a method of pressurizing a CsI film mainly formed of columnar crystals in a heated state by a roller moving along a recessed surface (for example, a spherical surface) of an input substrate to thereby make a surface portion of the CsI film continuous and flat. This method can enhance controllability over planarity of the CsI film, but on the other hand, limits the shape of the recessed surface of the input substrate due to a limited movement route of the roller used for flattening.

It is an object of the present invention to provide a method and a device for producing an X-ray image detector capable of efficiently and uniformly flattening an X-ray light emitting phosphor film. It is another object to provide an X-ray image detector to which such a flattening method is applied to enable improved resolution and display sharpness of an X-ray image.

DISCLOSURE OF THE INVENTION

A method for producing an X-ray image detector according to one of the aspects of the present invention is characterized in that it includes: forming an X-ray light emitting phosphor film that converts an X-ray to light, on an input substrate constituting an input part of the X-ray image detector; and irradiating the X-ray light emitting phosphor film with high-energy light having a wavelength of 500 nm or less to flatten a surface portion of the X-ray light emitting phosphor film by sublimation and/or fusion.

A device for producing an X-ray image detector according to another aspect of the present invention is characterized in that it includes: a high-energy light generating source configured to irradiate an X-ray light emitting phosphor film with high-energy light having a wavelength of 500 nm or less, the X-ray light emitting phosphor film being formed on an input substrate constituting an input part of the X-ray image detector; and a mechanism configured to move the input substrate on which the X-ray light emitting phosphor film is formed, in an irradiation direction of the high-energy light and in a direction orthogonal to the irradiation direction.

In the present invention, preferably, a total energy amount of the high-energy light with which the X-ray light emitting phosphor film is irradiated is controlled to be within a range of $1\times10^{-2}$ J/mm$^2$ to $5\times10^{-2}$ J/mm$^2$. Further, preferably, the irradiation time of the X-ray light emitting phosphor film with the high-energy light is within a range of 10 nsec to 20 nsec.

In the method and device for producing an X-ray image detector of the present invention, the X-ray light emitting phosphor film constituted of, for example, a CsI film is irradiated with the high-energy light, so that a surface portion of the X-ray light emitting phosphor film is flattened by local sublimation and/or fusion. This makes it possible to efficiently and uniformly make the surface portion of the X-ray light emitting phosphor film flat and continuous. Further, since the irradiation area of the high-energy light can be controlled according to a recessed surface shape of the input substrate or the like, which realizes applicability to various kinds of X-ray image detectors.

An X-ray image detector according to still another aspect of the present invention is characterized in that it includes: a vacuum envelope; an input part disposed on one end portion side of the vacuum envelope and having an X-ray light emitting phosphor film, a transparent conductive film, and a photoelectric surface that are formed on an input substrate in sequence, the input part being configured to convert an incident X-ray image to a photoelectron image; and an output part disposed on the other end portion side of the vacuum envelope and configured to convert the photoelectron image to a visible light image to output the visible light image, and that the X-ray light emitting phosphor film has a surface that has been flattened by irradiation with high-energy light, and a pitch x[μm] of irradiation traces of the high-energy light has a value satisfying $x \leq 1.48 \times 10^8/y$, where x[μm] is the pitch of the irradiation traces of the high-energy light and y is the number of pixels of an imaging part or a display part of the visible light image outputted from the output part.

BEST MODE FOR CARRYING OUT THE INVENTION

Hereinafter, embodiments of the present invention will be explained.

Figure 1:
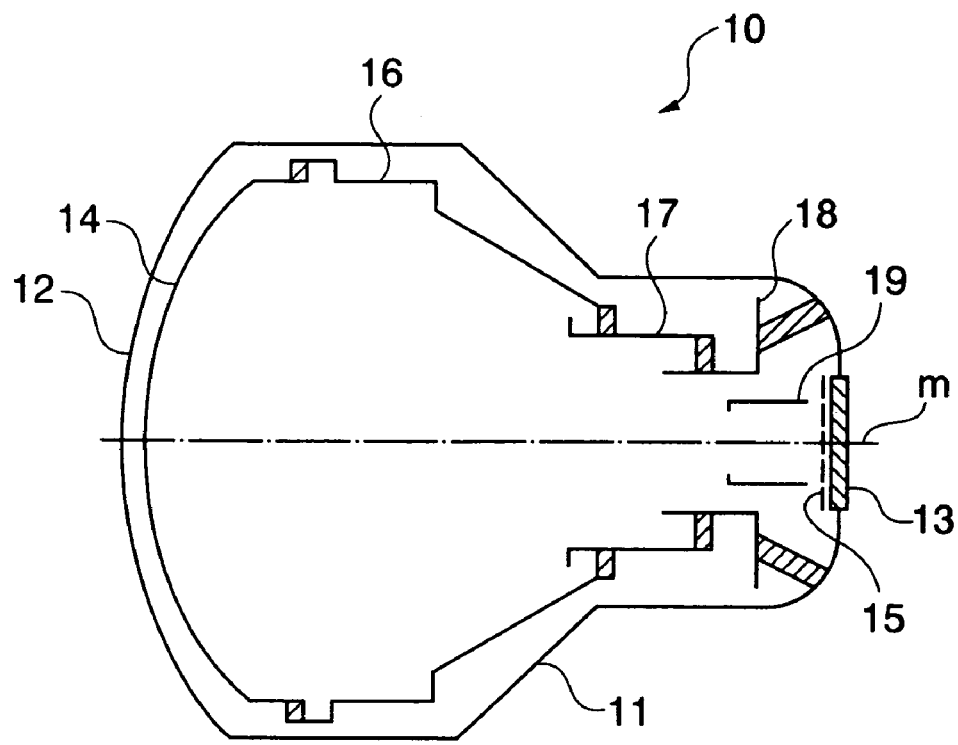
FIG. 1 is a view showing the schematic configuration of one structure example of an X-ray image detector to which a production method of the present invention is applied.

First, the configuration of an X-ray image detector to which a production method of the present invention is applied will be explained with reference to FIG. 1. FIG. 1 is a view showing the schematic configuration of a structure example of the X-ray image detector that is produced by applying the present invention. FIG. 1 shows an X-ray image tube as an example of the X-ray image detector. It should be noted that the X-ray image tube shown in FIG. 1 shows one embodiment of the X-ray image detector of the present invention.

An X-ray image tube 10 shown in the drawing has a vacuum envelope made of metal, glass, or the like. The vacuum envelope 11 constitutes an outer tube of the X-ray image tube 10 and the inside thereof is maintained vacuum at, for example, $1 \times 10^{-5}$ Pa or less. The vacuum envelope 11 has an input window 12 provided at one end portion side thereof (a side where the X-ray is incident) and an output window 13 provided on the other end portion side (a side where an output image is taken out).

An input part 14 is provided on a vacuum side of the input window 12 of the vacuum envelope 11 and an output part 15 is provided on a vacuum side surface of the output window 13. A plurality of cylindrical focusing electrodes 16, 17, 18 are interposed between the input part 14 and the output part 15, and a cylindrical anode 19 is further disposed in the vicinity of the output part 15. Note that the reference symbol m denotes a tube axis in FIG. 1.

Figure 2:
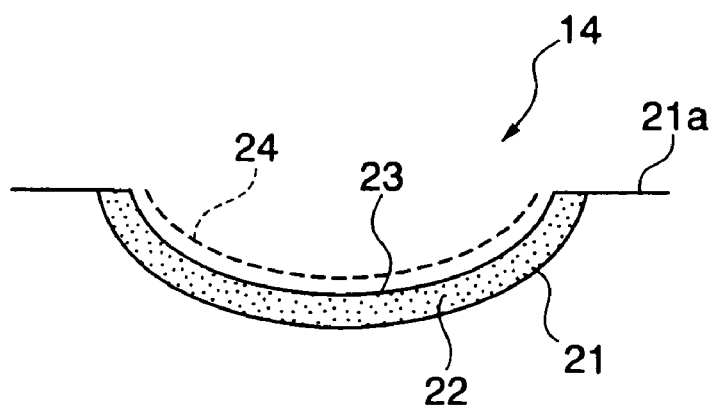
FIG. 2 is an enlarged cross sectional view showing an input part of the X-ray image detector shown in FIG. 1.

The input part 14 of the X-ray image tube 10 has a structure, for example, as shown in FIG. 2. In FIG. 2, the reference numeral 21 denotes an input substrate having a recessed surface in a dome shape, and for example, an Al (aluminum) substrate or a Be (beryllium) substrate constitutes this input substrate 21. Along the periphery of the input substrate 21, a flange 21a for fixing the input substrate 21 to the vacuum envelope 11 is provided.

An X-ray light emitting phosphor film 22 that converts an X-ray incident on the X-ray image tube 10 to light is formed on the dome-shaped recessed surface of the input substrate 21. The X-ray light emitting phosphor film 22 is formed of, for example, a cesium iodide (CsI) film deposited in an $N_2$ (nitrogen) atmosphere at 0.1 Pa to 1.5 Pa on the dome-shaped recessed surface of the input substrate 21. The CsI film 22 as the X-ray light emitting phosphor film is mainly formed of columnar crystals and the CsI columnar crystals are separated from one another by minute gaps. The use of such a CsI film 22 as the X-ray light emitting phosphor film can realize enhancement in sharpness of separation between channels of a scintillator.

A transparent conductive film, for example, an ITO conductive film 23 is formed on the CsI film 22 as structured above. Further, a layer constituting a photoelectric surface 24 where the light converted by the CsI film 22 is further converted to electrons is formed on the ITO conductive film 23. These input substrate 21 and layers 22, 23, 24 constitute the input part 14. Incidentally, the input part 14 may also be directly formed on an inner face of the input window 12 of the vacuum envelope 11.

In the X-ray image tube 10 having the above-described configuration, the X-ray that has transmitted through a subject is first incident on the input part 14 through the input window 12. The X-ray (an X-ray image) incident on the X-ray image tube 10 is converted to photoelectrons (a photoelectron image) in the input part 14, and is further accelerated and focused in the focusing electrodes 16 to 18 and the anode 19 to be incident on the output part 15. The photoelectrons (photoelectron image) are converted to visible light (a visible light image) in the output part 15 to be outputted to the outside through the output window 13.

The visible light image outputted to the outside from the X-ray image tube 10 is photographed by an imaging part such as a not-shown CCD camera and further sent to a display part such as a monitor television via a camera control unit or the like. The X-ray image having information when it passes through the subject (information based on the absorption or scattering of the X-ray by the subject) is displayed on the display part such as the monitor television as a subject image.

Figure 3:
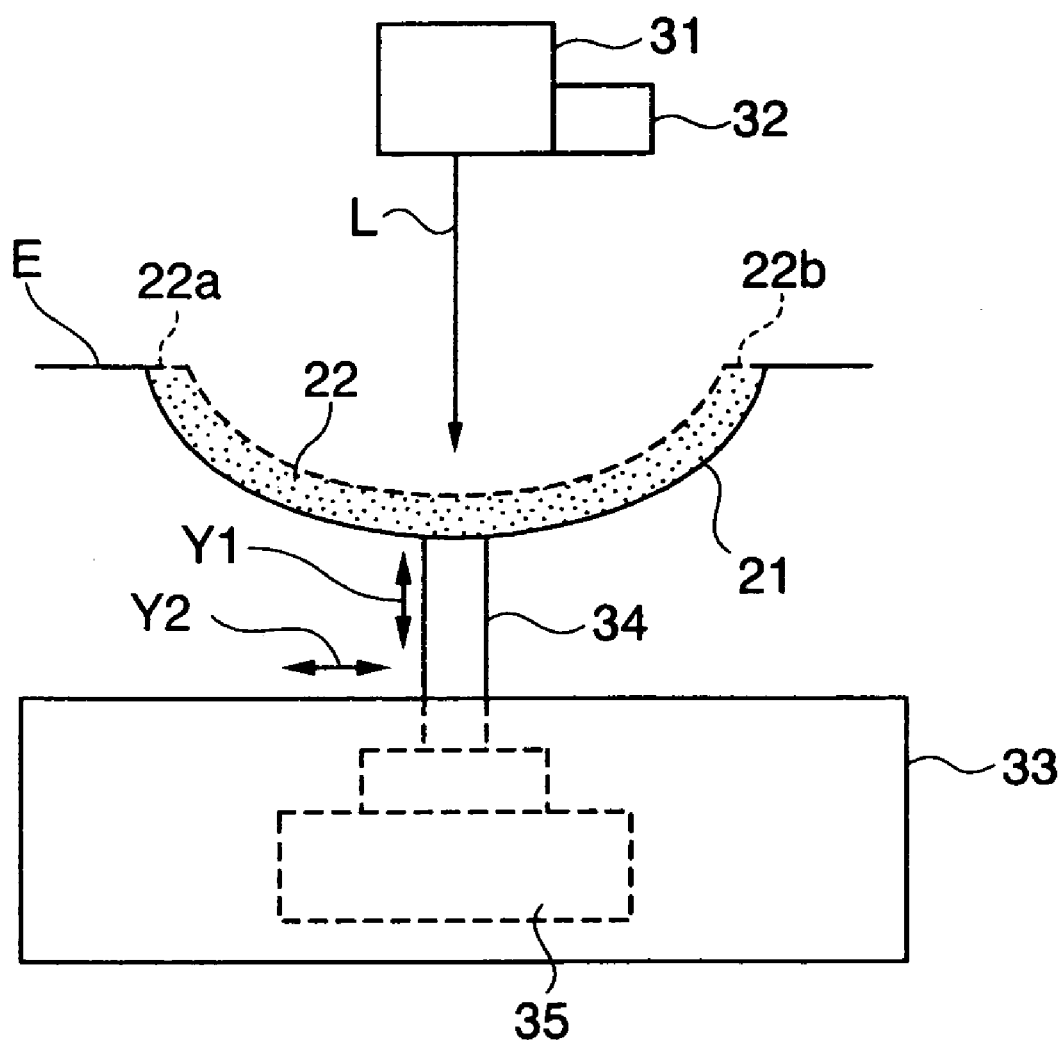
FIG. 3 is a view showing the schematic configuration of a method for producing an X-ray image detector according to an embodiment of the present invention.

Next, an embodiment where a production method and a production device of the present invention are applied to a production process of the above-described X-ray image tube 10 will be explained. FIG. 3 is a view showing the schematic configuration of a device for producing an X-ray image tube (a flattening device of an X-ray light emitting phosphor film) according to an embodiment of the present invention. Note that, in FIG. 3, the same reference numerals and symbols are used to designate portions (the input part 14 of the X-ray image tube) corresponding to those in FIG. 2, and repeated explanation will be partly omitted.

The device for producing the X-ray image tube 10 (the flattening device of the X-ray light emitting phosphor film) shown in FIG. 3 has a generating source 31 of high-energy light L that flattens a surface portion of the X-ray light emitting phosphor film (the CsI film 22 in FIG. 3) by sublimation and/or fusion. Here, light having a wavelength of 500 nm or less is used as the high-energy light L with which the X-ray light emitting phosphor film is irradiated.

Figure 4:
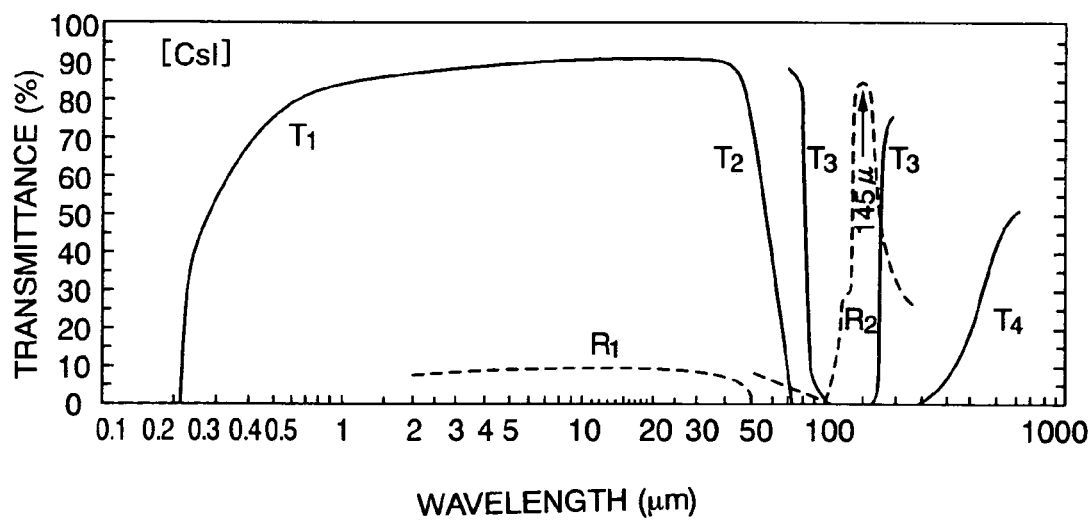
FIG. 4 is a characteristic chart showing transmittance depending on a light wavelength when the thickness of cesium iodide (CsI) used as an X-ray light emitting phosphor film is 5 mm.

The high-energy light L with a wavelength exceeding 500 nm is not absorbed very much by CsI as is apparent from FIG. 4, so that energy of the high-energy light L cannot be sufficiently transmitted to the surface of the X-ray light emitting phosphor film. As a result, the X-ray light emitting phosphor film (CsI film 22) cannot be flattened in a good condition.

Further, the light L transmitting through the X-ray light emitting phosphor film heats the input substrate 21 (for example, an Al substrate), and this heat heats the X-ray light emitting phosphor film, so that the CsI film 22 peels off the substrate 21 or the minute gaps between the columnar crystals of CsI disappear due to fusion, which causes uneven luminance, resolution deterioration, and the like in an X-ray image intensifier image. The wavelength of the high-energy light L is more preferably 400 nm or less, and desirably, 250 nm or less.

The high-energy light L with which the X-ray light emitting phosphor film is irradiated preferably has an output capable of giving high energy to the X-ray light emitting phosphor film in a short time. Light with a small output [W/mm$^2$] requires a longer irradiation time [sec] for giving a certain energy amount [J/mm$^2$] to the X-ray light emitting phosphor film, which may possibly cause quality deterioration and the like not only on the surface portion of the X-ray light emitting phosphor film but also on an inner side thereof.

The total energy amount of the high-energy light L with which the X-ray light emitting phosphor film is irradiated is preferably within a range of $1 \times 10^{-2}$ J/mm$^2$ to $5 \times 10^{-2}$ J/mm$^2$ in consideration of an effect of flattening the surface of the X-ray light emitting phosphor film and a film property maintaining effect. Therefore, light having output energy capable of realizing such a total energy amount in a short time (for example, 20 nsec or less, preferably, 10 nsec to 20 nsec) is preferably applied as the high-energy light L. A laser beam is suitable as such high-energy light L. The specific kind of the laser beam should be appropriately selected in consideration of a wavelength, output energy, and so on.

An example of light having the wavelength and high output as described above is an excimer laser beam. An oscillation frequency range of the excimer laser is concentrated in an ultraviolet range, a pulse width thereof is short (for example, 10 nsec to 30 nsec), and a peak output and average output thereof are large. The production device (flattening device) shown in FIG. 3 has a laser beam source as the generating source 31 of the high-energy light L, and an excimer laser device is suitably used as the laser beam source 31.

When the flattening device of this embodiment is applied to flattening of the CsI film 22, the use of the excimer laser device as the laser beam source 31 is preferable as described above. The excimer laser device used as the laser beam source 31 is a laser device containing rare gas such as argon, krypton, and xenon or containing halogen gas together with these gases, and it generates, for example, a pulsed laser beam L. The pulse time of the laser beam L is preferably within the range of 10 nsec to 20 nsec as described above. The excimer laser device has an oscillation wavelength of, for example, 193 nm to 351 nm.

In the vicinity of an irradiation opening of the laser beam source 31 as described above, a sensor 32 that monitors a focus position of the laser beam L is disposed. The dome-shaped input substrate 21 shown in FIG. 2 is disposed under the laser beam source 31. As shown in FIG. 2, the CsI film 22 is formed on the recessed surface portion of the input substrate 21. The input substrate 21 is placed such that a circular opening face surrounded by an outer periphery E of the recessed surface portion is orthogonal to an irradiation direction of the laser beam L outputted from the laser beam source 31.

The input substrate 21 is fixed to a support member 34 of an XYZ stage 33, and the support member 34 is coupled to a driving device 35. When the XYZ stage 33 is put into an operation state, the support member 34 moves in the irradiation direction of the laser beam L (vertical direction in the drawing) shown by the arrow Y1 and the direction orthogonal to the irradiation direction of the laser beam L (right and left direction in the drawing) shown by the arrow Y2. Further, the XYZ stage 33 moves the support member 34 in a direction (front and rear direction in the drawing) orthogonal to the two directions shown by the arrow Y1 and the arrow Y2. Thus, the XYZ stage 33 is configured to be capable of moving the input substrate 21 in three-dimensional directions.

In the production device (flattening device) of the above-described embodiment, the laser beam L is emitted from the laser beam source 31 toward the CsI film 22 on the input substrate 21. When the laser beam L is emitted, the input substrate 21 is first placed, for example, such that a periphery 22a of the CsI film 22 on the left side of the drawing is positioned directly under the irradiation opening of the laser beam source 31. Next, the XYZ stage 33 is driven to move the input substrate 21 in the leftward direction shown by the arrow Y2. At the same time, the input substrate 21 is also moved in the back and forth direction in the drawing, so that the input substrate 21 is moved in two-dimensional directions. The input substrate 21 is finally moved to such a position that a periphery 22b of the CsI film 22 on the right side of the drawing is directly under the irradiation opening of the laser beam source 31.

At this time, the distance between the laser beam source 31 and the CsI film 22 varies in accordance with the movement of the input substrate 21 due to the dome-shaped recessed surface of the input substrate 21. Therefore, the input substrate 21 is moved in the irradiation direction (the vertical direction in the drawing) of the laser beam L shown by the arrow Y1 as well as being moved in the horizontal direction, so that the distance between the laser beam source 31 and the CsI film 22 is controlled to be unchanged. Note that, when the distance between the laser beam source 31 and the CsI film 22 varies at the time of the irradiation of the laser beam L, the sensor 32 detects a variation amount and the control is made to eliminate the variation amount.

Figure 5A:
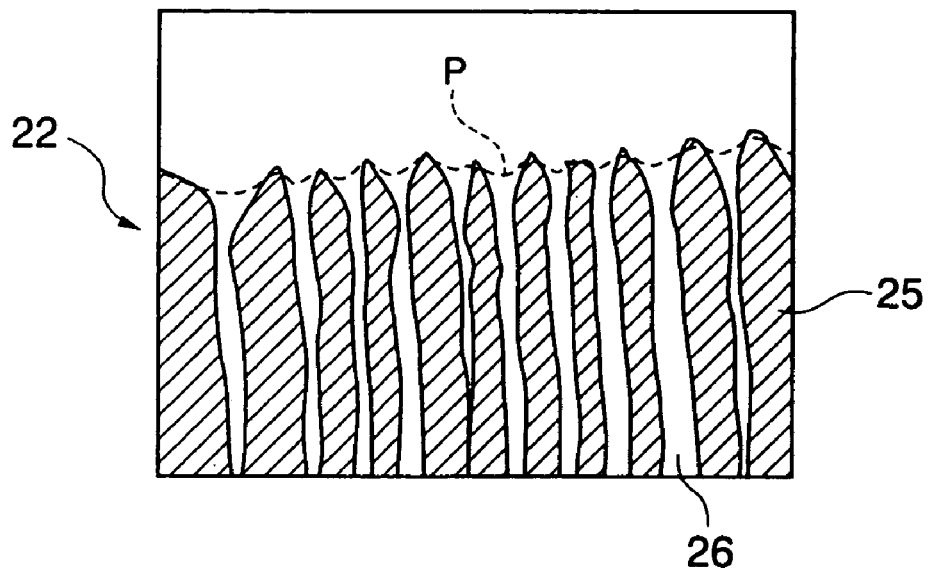
FIG. 5A and FIG. 5B are cross sectional views schematically showing a flattening process of a CsI film based on the present invention.
Figure 5B:
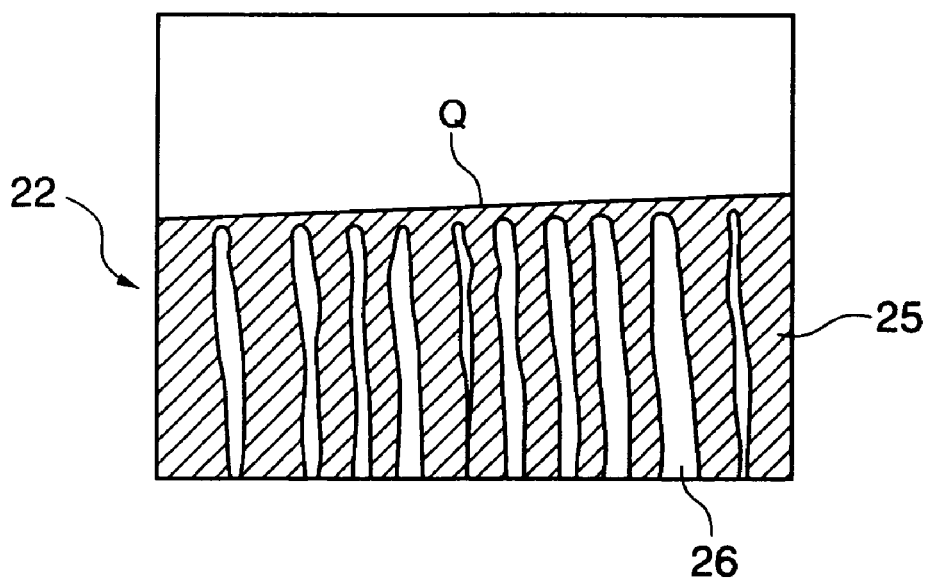

FIG. 5A is a cross sectional view schematically showing the minute structure of the CsI film 22 at the stage when it is deposited (before it is irradiated with the laser beam L), and FIG. 5B is a cross sectional view schematically showing the minute structure of the CsI film 22 after it is irradiated with the laser beam L. As is seen from the comparison between a surface P of the CsI film 22 in FIG. 5A and a surface Q of the CsI film 22 in FIG. 5B, the irradiation of the surface portion of the CsI film 22 with the laser beam L can uniformly flatten the surface of the CsI film 22.

The flattening of the CsI film 22 mainly formed of the columnar crystals will be further detailed. The CsI film 22 formed by a deposition method is mainly formed of columnar crystals 25, for example, as shown in FIG. 5A, and minute gaps 26 exist between these columnar crystals 25. Recessions and protrusions formed by top portions of the columnar crystals 25 exist on the surface P of such a CsI film 22. Further, the minute gaps 26 between the columnar crystals 25 produce a discontinuous state of the surface portion of the CsI film 22.

When the surface portion of the CsI film 22 is irradiated with the above-mentioned high-energy light such as the laser beam L, its high energy causes local temperature rise of the surface portion of the CsI film 22, so that the surface portion is sublimated and/or fused, as shown in FIG. 5B. Since the emitted laser beam L concentrates on the protruding portions of the recessions and protrusions existing on the surface of the CsI film 22, the protruding portions are sublimated and/or fused due to their temperature rise to be flattened, and the adjacent columnar crystals 25 are fused to be continuous. Since the high-energy light such as the laser beam L locally heats the surface portion of the CsI film 22 in a short time, a bulk portion of the CsI film 22 is not heated, so that the columnar crystals 25 are kept separated from one another by the minute gaps 26.

Here, the total energy amount of the high-energy light such as the laser beam L with which the surface of the CsI film 22 is irradiated is preferably controlled to be within the range of $1 \times 10^{-2}$ $J/mm^2$ to $5 \times 10^{-2}$ $J/mm^2$ as stated above. Further, the irradiation time of the high-energy light such as the laser beam L (for example, the pulse time of the laser beam L) is preferably within the range of 10 nsec to 20 nsec.

Figure 6:
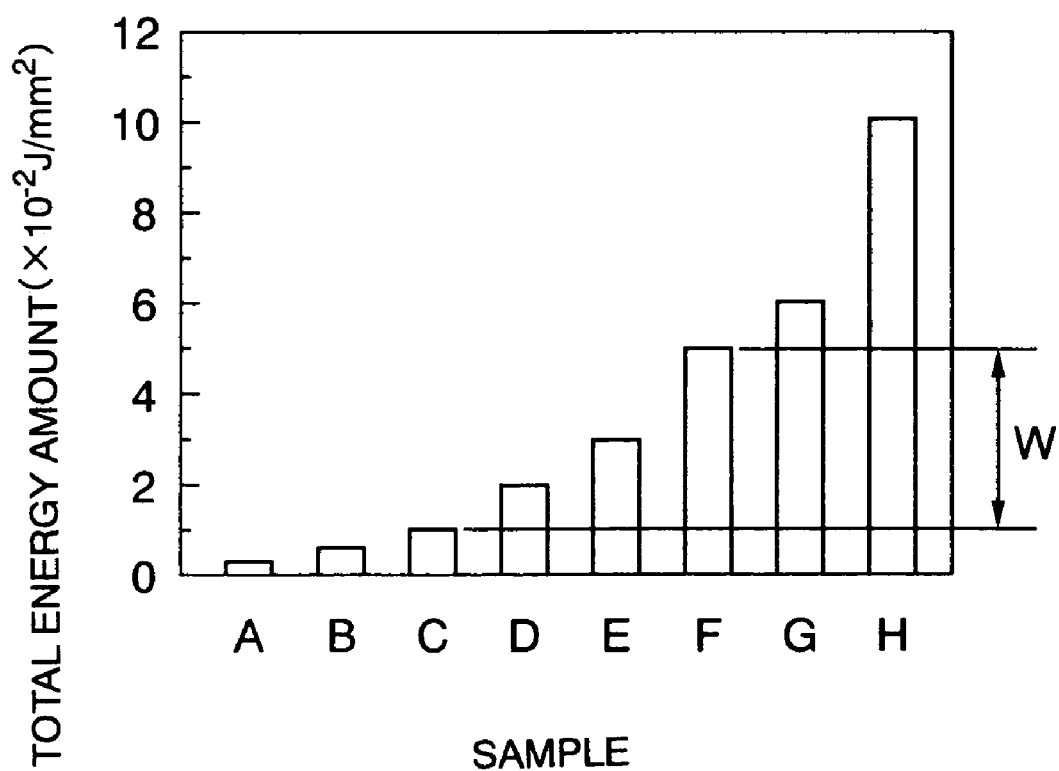
FIG. 6 is a chart showing a total energy amount of high-energy light with which the CsI film in each sample is irradiated by the embodiment of the present invention.

FIG. 6 shows the total energy amount of the laser beam L with which each of samples (A to H) subjected to the flattening by this embodiment is irradiated. In the samples A, B which were irradiated with the laser beam L having the total energy amount of less than 1 $J/mm^2$, good planarity of the CsI film was not obtained. In the samples G, H where the total energy amount exceeds 5 $J/mm^2$, the CsI film peeled off. In contrast, in all the samples C, D, E, F subjected to the irradiation of the total energy amount within the range of 1 $J/mm^2$ to 5 $J/mm^2$, good planarity was obtained. Therefore, the total energy amount with which the X-ray light emitting phosphor film is irradiated is preferably within the range of 1 $J/mm^2$ to 5 $J/mm^2$ shown by the reference symbol W. The total energy amount of the high-energy light with which the X-ray light emitting phosphor film is irradiated is more preferably within a range of 2 $J/mm^2$ to 5 $J/mm^2$.

As described above, by the irradiation of the entire CsI film 22 with the high-energy light such as the laser beam L, the surface portion of the CsI film 22 can be efficiently and uniformly made flat and continuous. The use of the excimer laser device as the laser beam source 31 for the CsI film 22 is effective as described above. The laser beam generated by the excimer laser device is low in transmittance through the CsI film 22 and is capable of heating the CsI film 22 efficiently. Accordingly, the surface portion of the CsI film 22 can be flattened in a short time. Thus, according to the present invention, the surface portion of the X-ray light emitting phosphor film such as the CsI film 22 can be efficiently and uniformly made flat and continuous.

Further, the irradiation area of the high-energy light such as the laser beam L can be three-dimensionally controlled according to the recessed surface shape of the input substrate (Al substrate) 21 as previously described. In other words, the recessed surface shape of the input substrate 21 is not limited. Therefore, the production method and the production device of the present invention are applicable to X-ray image detectors in various shapes.

The transparent conductive film made of the ITO conductive film 23 or the like and a layer constituting the photoelectric surface 24 are formed on the CsI film 22 that has gone through the flattening process. The input part 14 of the X-ray image tube 10 is produced in this manner. Such an input part 14 is incorporated in the vacuum envelope 11 having the output part 13, the cylindrical focusing electrodes 16, 17, 18, the cylindrical anode 19, and so on, which are shown in FIG. 1, in the usual manner, so that the aimed X-ray image tube 10 is obtainable.

Figure 7:
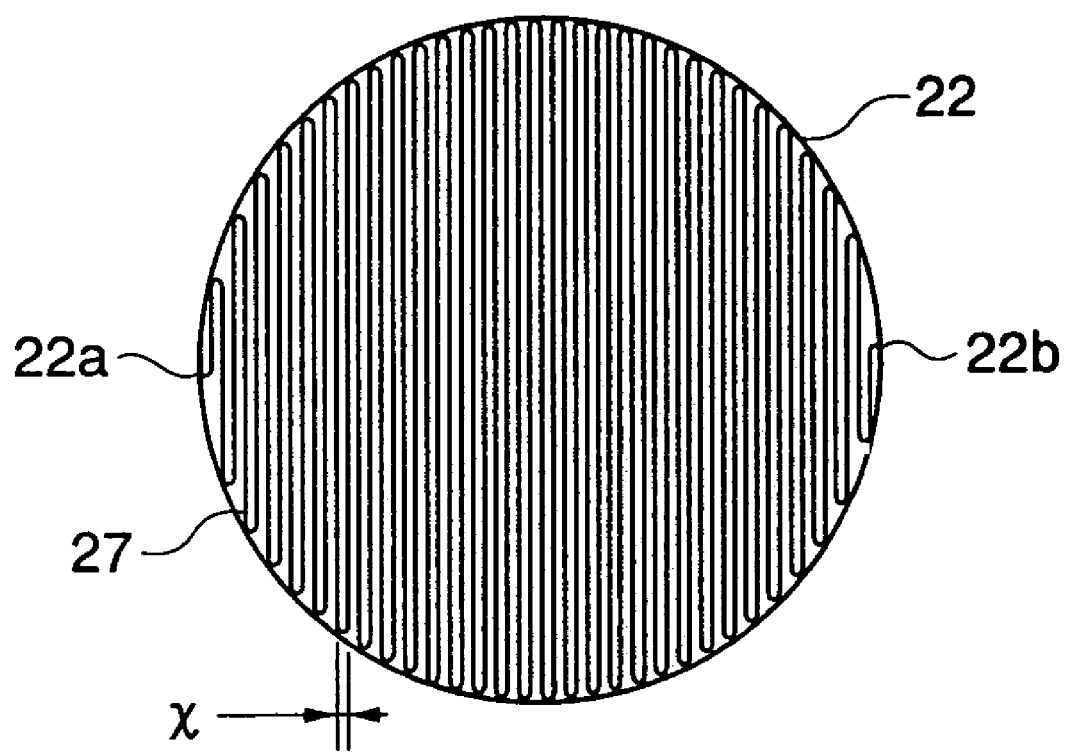
FIG. 7 is a view schematically showing the state of the CsI film surface flattened by the embodiment of the present invention.

The X-ray image detector (X-ray image tube 10) according to the embodiment of the present invention has, as the X-ray light emitting phosphor film, the CsI film 22 that has been irradiated with the high-energy light such as the laser beam L. The surface portion of the CsI film 22 has been made flat and continuous by the irradiation with the high-energy light such as the laser beam L. FIG. 7 is a view schematically showing the surface state after the CsI film 22 is irradiated with the laser beam L. In FIG. 7, the reference numeral 27 denotes irradiation traces of the laser beam L.

The irradiation with the laser beam L is made such that the pitch x [μm] of the irradiation traces thereof has a predetermined value. Here, the pitch x of the irradiation traces of the laser beam L represents an average value of measured pitches, for example, in a one-third center portion among three equally divided portions of a virtual line that is drawn from the center of the input substrate 21 to the outer periphery thereof so as to cross the irradiation traces in an orthogonal direction.

Specifically, the pitch x [μm] of the irradiation traces of the laser beam L is set to a value satisfying the relationship $x \leq 1.48 \times 10^8/y$, where y is the number of pixels of the imaging part (for example, a CCD camera) that picks up a visible light image outputted from the X-ray image tube 10 or is the number of pixels of the display part (for example, a monitor television) that displays a subject image picked up by the imaging part. A larger value between the number of pixels of the imaging part and that of the display part is selected as the number of pixels y.

For example, when a CCD camera or a monitor television which has 400,000 pixels is used, the pitch x of the irradiation traces of the laser beam L is set to 370 μm or less based on the above relational expression between x and y. When the pitch x of the irradiation traces of the laser beam L exceeds 370 μm, the irradiation traces of the laser beam L are displayed as noises. This also applies to the use of a CCD camera or a monitor television having the different number of pixels. In other words, setting of the irradiation pitch x of the laser beam L so as to satisfy the above relational expression between x and y realizes enhancement in resolution and display sharpness of a subject image.

In the above-described embodiment, the explanation is given on the example where the input substrate 21 such as the Al substrate is moved in the vertical direction while being moved in the horizontal direction when the X-ray light emitting phosphor film such as the CsI film 22 is irradiated with the laser beam. The movement of the input substrate may be rotational movement with its center being the rotation axis. The irradiation of the laser beam is first made on the center of the input substrate, and then directed toward the outer side thereof along a spiral orbit. The adoption of such an irradiation method also makes it possible to obtain good planarity and display sharpness if the above relational expression between x and y is satisfied.

INDUSTRIAL APPLICABILITY

According to a method and a device for producing an X-ray image detector of the present invention, it is possible to efficiently obtain an X-ray light emitting phosphor film excellent in planarity in a surface portion thereof. An X-ray image detector having such an X-ray light emitting phosphor film contributes to improvement in a resolution characteristic and a display characteristic of an X-ray image (subject image).

What is claimed is:

1. A method for producing an X-ray image detector, comprising:
   forming an X-ray light emitting phosphor film that converts an X-ray to light, on an input substrate constituting an input part of the X-ray image detector; and
   irradiating the X-ray light emitting phosphor film with high-energy light having a wavelength of 500 nm or less to flatten a surface portion of the X-ray light emitting phosphor film by sublimation and/or fusion.

2. A method for producing an X-ray image detector as set forth in claim 1,
   wherein a total energy amount of the high-energy light with which the X-ray light emitting phosphor film is irradiated is controlled to be within a range of $1 \times 10^{-2}$ $J/mm^2$ to $5 \times 10^{-2}$ $J/mm^2$.

3. A method for producing an X-ray image detector as set forth in claim 2,
   wherein the irradiation time of the high-energy light to the X-ray light emitting phosphor film is within a range of 10 nsec to 20 nsec.

4. A method for producing an X-ray image detector as set forth in claim 1,
   wherein a laser beam is used as the high-energy light.

5. A method for producing an X-ray image detector as set forth in claim 1,
   wherein a CsI film mainly formed of columnar crystals is used as the X-ray light emitting phosphor film, and top portions of the columnar crystals of the CsI film are sublimated and/or fused by the high-energy light to be made flat and continuous.

6. A device for producing an X-ray image detector, comprising:
   a high-energy light generating source configured to irradiate an X-ray light emitting phosphor film with high-energy light having a wavelength of 500 nm or less, the X-ray light emitting phosphor film being formed on an input substrate constituting an input part of the X-ray image detector; and
   a mechanism configured to move the input substrate on which the X-ray light emitting phosphor film is formed, in an irradiation direction of the high-energy light and a direction orthogonal to the irradiation direction.

7. A device for producing an X-ray image detector as set forth in claim 6,
   wherein said high-energy light generating source has a laser beam source.

8. A device for producing an X-ray image detector as set forth in claim 6,
   wherein a total energy amount of the high-energy light with which the X-ray light emitting phosphor film is irradiated is controlled to be within a range of $1 \times 10^{-2}$ $J/mm^2$ to $5 \times 10^{-2}$ $J/mm^2$.

9. A device for producing an X-ray image detector as set forth in claim 8,
   wherein the irradiation time of the high energy light to the X-ray light emitting phosphor film is within a range of 10 nsec to 20 nsec.

10. An X-ray image detector comprising:
    a vacuum envelope;
    an input part provided on one end portion side of said vacuum envelope and having an X-ray light emitting phosphor film, a transparent conductive film, and a photoelectric surface that are formed in sequence on an input substrate, said input part being configured to convert an incident X-ray image to a photoelectron image; and
    an output part provided on the other end portion side of said vacuum envelope and configured to convert the photoelectron image to a visible light image to output the visible light image,
    wherein the X-ray light emitting phosphor film has a surface that has been flattened by irradiation with high-energy light, and a pitch $x[\mu m]$ of irradiation traces of the high-energy light has a value satisfying $x \leq 1.48 \times 10^8/y$, where $x[\mu m]$ is the pitch of the irradiation traces of the high-energy light and y is the number of pixels of an imaging part or a display part of the visible light image outputted from said output part.

11. An X-ray image detector as set forth in claim 10,
    wherein the X-ray light emitting phosphor film has a CsI film mainly formed of columnar crystals.

12. An X-ray image detector as set forth in claim 11,
    wherein the CsI film is flat and continuous due to sublimation and/or fusion of top portions of the columnar crystals.

* * * * *